United States Patent
He et al.

(10) Patent No.: US 11,697,092 B2
(45) Date of Patent: Jul. 11, 2023

(54) SEPARATION AND PURIFICATION COUPLED PROCESS WITH HIGH HELIUM YIELD AND DIVERSIFIED PRODUCTS

(71) Applicants: Dalian University of Technology, Liaoning (CN); Panjin Institute of Industrial Technology, Dalian University of Technology, Liaoning Province (CN)

(72) Inventors: Gaohong He, Liaoning (CN); Minggang Guo, Liaoning (CN); Yan Dai, Liaoning (CN); Xuehua Ruan, Liaoning (CN); Panpan Mi, Liaoning (CN); Xiaohang Yang, Liaoning (CN)

(73) Assignees: Dalian University of Technology, Liaoning (CN); Panjin Institute of Industrial Technology, Dalian University of Technology, Liaoning Province (CN)

( * ) Notice: Subject to any disclaimer, the term of this patent is extended or adjusted under 35 U.S.C. 154(b) by 66 days.

(21) Appl. No.: 17/356,117

(22) Filed: Jun. 23, 2021

(65) Prior Publication Data
US 2021/0402345 A1  Dec. 30, 2021

(30) Foreign Application Priority Data
Jun. 24, 2020 (CN) .......................... 202010587840.8

(51) Int. Cl.
B01D 53/047 (2006.01)
B01D 53/22 (2006.01)
C01B 23/00 (2006.01)

(52) U.S. Cl.
CPC ........ *B01D 53/047* (2013.01); *C01B 23/0042* (2013.01); *C01B 2210/0031* (2013.01)

(58) Field of Classification Search
None
See application file for complete search history.

(56) References Cited

U.S. PATENT DOCUMENTS

2017/0312682 A1*  11/2017  Keller ................. B01D 53/047

FOREIGN PATENT DOCUMENTS

| CN | 103879978 A | * | 6/2014 | |
| CN | 107899377 A | * | 4/2018 | ............ B01D 46/00 |
| WO | WO-2017020919 A1 | * | 2/2017 | |

OTHER PUBLICATIONS

WO2017020919A1 English Translation retrieved from Espacenet, 2022, pp. 1-9 (Year: 2022).*
CN103879978A English Translation retrieved from Espacenet, 2022, 1-6 (Year: 2022).*
CN107899377A English Translation retrieved from Espacenet, 2022, pp. 1-18 (Year: 2022).*

* cited by examiner

*Primary Examiner* — Philip Y Louie
(74) *Attorney, Agent, or Firm* — Cesari & McKenna, LLP

(57) ABSTRACT

A separation and purification coupled process with a high helium yield and diversified products is provided. The process is as follows. Firstly, a low-concentration helium-containing gas after being pressurized and pre-treated enters a two-stage and two-section membrane separation unit to produce a helium product with a medium concentration by concentrating stage by stage through the membrane separation unit. A part of the helium with medium concentration enters an adsorption unit for further concentration to produce a helium product above grade A.

6 Claims, 1 Drawing Sheet

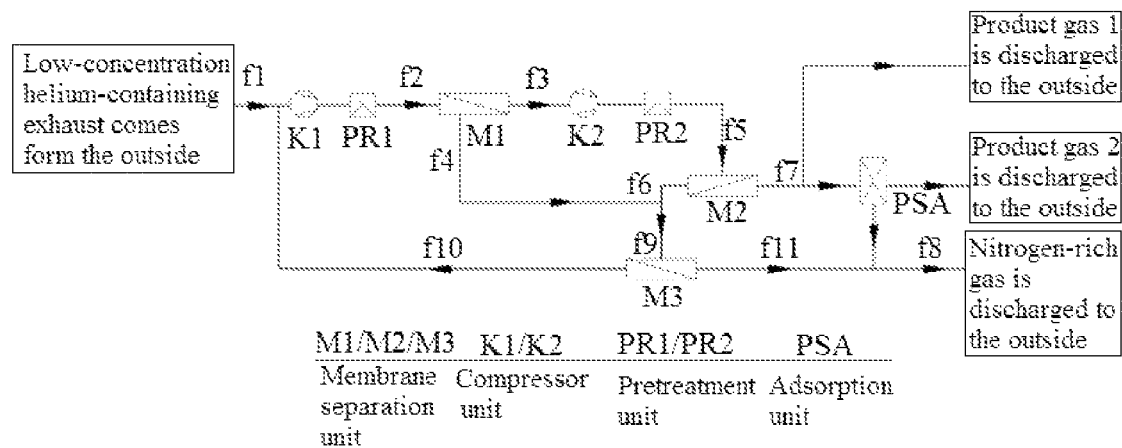

SEPARATION AND PURIFICATION COUPLED PROCESS WITH HIGH HELIUM YIELD AND DIVERSIFIED PRODUCTS

CROSS REFERENCE TO RELATED APPLICATION(S)

This patent application claims the benefit and priority of Chinese Patent Application No. 202010587840.8 filed on Jun. 24, 2020 and entitled "Separation and Purification Coupled Process with High Helium Yield and Diversified Products", the disclosure of which is incorporated by reference herein in its entirety as part of the present application.

TECHNICAL FIELD

The present disclosure belongs to the technical field of gas separation and recovery, relates to a separation and purification coupled process with a high helium yield and diversified products, and in particular, to a helium purification, separation and recovery process by a membrane coupling method.

BACKGROUND ART

Helium is one of indispensable rare strategic materials for a development of national defense, military industry, and high-technology industry, and is widely used in fields of scientific research, aeronautics and astronautics, refrigeration, medical treatment, optical fibers, leak detection, superconducting experiments, metal manufacturing, deep-sea diving, high-precision welding production and so on. Therefore, it is of great significance for improving an economical efficiency of helium production and guaranteeing national helium use safety by researching and developing advanced helium extraction technologies while protecting limited helium resources.

In actual application of various fields, purities of helium products are required to be 85 vol % to 99.999 vol %. In current stage, traditional helium separation, purification and recovery processes mainly include a deep cooling method, a pressure swing adsorption method, and a membrane separation method. High-purity helium with high concentration can be obtained by all of the three processes. However, there are problems of single helium product, low recovery rate, high equipment investment, high operation energy consumption and so on. Therefore, it is urgent to develop an optimized coupled process with complementary advantages of various technologies in a helium production process, so as to produce diversified helium products with low cost and high yield.

SUMMARY

In view of the problems in the prior art, the present disclosure provides a separation and purification coupled process with a high helium yield and diversified products. In the process, a helium-containing feed gas is preliminarily concentrated by using a membrane separation process first. A first part of a concentrated helium-containing gas is directly used as products in the fields of refrigeration of household appliances, low temperature superconductivity and so on, and a second part of the concentrated helium-containing gas enters a pressure swing adsorption unit for performing helium refining to produce the helium above grade A, which solves a problem of singe products caused by a traditional single process. Multiple stages of helium-containing gas recycling is realized and a problem of low-helium recovery yield in the traditional process is solved through an optimized design of two-stage and a two-section membrane separation unit. A complementation of the advantages of a membrane technology and an adsorption technology is realized by coupling and optimizing the two processes, so as to reduce a production cost of helium.

In order to achieve the above-mentioned objective, a technical solution adopted by the present disclosure is as follows.

A separation and purification coupled process with a high helium yield and diversified products is implemented based on a helium purification, separation and recovery coupled system. The helium purification, separation and recovery coupled system includes a compressor unit, a pretreatment unit, a membrane separation unit, and a pressure swing adsorption unit PSA. The compressor unit includes a first compressor K1 and a second compressor K2. The pretreatment unit includes a first pretreatment unit PR1 and a second pretreatment unit PR2. The membrane separation unit is a hollow fiber membrane component, a flat membrane component, a tubular membrane component, or a coiled membrane component, and includes a first membrane separation unit M1, a second membrane separation unit M2, and a third membrane separation unit M3. The process includes:

firstly, mixing a helium-containing feed gas f1 and a recycle gas f10, passing a first mixture of gases of the helium-containing feed gas f1 and the recycle gas f10 through the first compressor K1 to be pressurized, entering a pressurized gas into the first pretreatment unit PR1 to remove liquid mist and dust through the first pretreatment unit PR1 and allow a temperature of the pressurized gas to be adjusted to 40 to 100° C., and entering a helium-containing gas f2 into the first membrane separation unit M1;

secondly, passing the helium-containing gas f2 through the first membrane separation unit M1 to be divided into two material flows, namely, a preliminarily concentrated helium-rich permeated gas f3 and a retentate gas f4 on a basis that different gases have different permeation rates upon passing through a same membrane; passing the preliminarily concentrated helium-rich permeated gas f3 (which is the gas that permeates through the first membrane separation unit preferentially) through the second compressor K2 to be pressurized, entering a pressurized helium-rich permeated gas into the second pretreatment unit PR2 to remove liquid mist and dust through the second pretreatment unit PR2 and allow a temperature of the pressurized helium-rich permeated gas to be adjusted to 40 to 100° C., entering a flow f5 from the second pretreatment unit PR2 into the second membrane separation unit M2; and entering the retentate gas f4 into the third membrane separation unit M3 through an inlet of the third membrane separation unit M3;

thirdly, passing the flow f5 through the second membrane separation unit M2 to be divided into two material flows, namely, a retentate gas f6 and a secondarily concentrated helium-rich permeated gas f7 on a basis that different gases have different permeation rates upon passing through a same membrane; discharging a first part of the secondarily concentrated helium-rich permeated gas f7 to an outside as a product gas with medium helium concentration; entering a second part of the secondarily concentrated helium-rich permeated gas f7 into the pressure swing adsorption unit PSA for further being concentrated to produce a helium above grade A; mixing the retentate gas f6 of the second membrane separation unit M2 and the retentate gas f4 of the first membrane separation unit M1; and finally, entering a mixed flow f9 of the retentate gas f6 and the retentate gas f4 into the third membrane separation unit M3 to be divided into two material flows, namely, a permeated gas f10 and a retentate gas f11, through the third membrane separation unit M3, returning the permeated gas f10 to an inlet of the first compressor K1 for recycling, mixing the retentate gas f11 and desorption gas f8 from the pressure swing adsorption unit PSA, and discharging a mixture of gases of the retentate gas f11 and a desorption gas f8 from the coupled system.

Further, the hollow fiber membrane component, the flat membrane component, the tubular membrane component, or the coiled membrane component may be an organic membrane, an inorganic membrane, or an organic-inorganic hybrid membrane.

Further, the material of the membrane may be a glassy polymer, such as polyimide, a rubber polymer, such as polydimethylsiloxane, or an inorganic membrane material, such as a molecular sieve.

Further, the pretreatment unit may be a dispenser, a heat exchanger, a precise filter, a demister and so on.

The embodiments have the following beneficial effects: a separation and purification coupled process with a high helium yield and diversified products is provided, the coupled process concentrates helium-containing gas stage by stage by using the membrane separation unit and the pressure swing adsorption unit PSA to realize a mutual complementation between the advantages of the membrane separation process and an adsorption process, and enable the membrane separation process and the adsorption process to operate under respective suitable process conditions, thereby reducing the production cost of helium. The permeated gas after secondary concentration by the second membrane separation unit M2 can serve as helium products required in the fields of refrigeration of household appliances, low temperature superconductivity and so on. A part of the permeated gas of the second membrane separation unit M2 is refined through the pressure swing adsorption unit to produce helium products above grade A, so as to realize diversification of the helium products and meet the requirements of various application fields on the helium products with different concentrations. In an optimization process of the coupled process, a helium-poor retentate gas from the second membrane separation unit M2 and the first membrane separation unit M1 is further concentrated through the third membrane separation unit M3, and the permeable gas of the third membrane separation unit M3 is recycled, which greatly improves the recovery rate of the helium. Taking a low-concentration helium-containing tail gas with a helium content of 4.95 vol % as an example, the concentration of a helium product on a permeation side of the second membrane separation unit M2 can reach over 85 vol %, the purity of a helium-rich gas product of an adsorption refining unit can reach above grade A, and the recovery rate of helium reaches over 99% by using the helium recovery process according to the present disclosure.

BRIEF DESCRIPTION OF THE DRAWING

The FIGURE is a principle process flow diagram of a separation and purification coupled process with a high helium yield and diversified products.

List of the reference characters: K1 first compressor; K2 second compressor; PR1 first pretreatment unit; PR2 second pretreatment unit; M1 first membrane separation unit; M2 second membrane separation unit; M3 third membrane separation unit; and PSA pressure swing adsorption unit.

DETAILED DESCRIPTION OF THE EMBODIMENTS

Specific embodiments of the present disclosure will be described below in detail with reference to technical solutions and accompanying drawings.

A separation and purification coupled process with a high helium yield and diversified products is implemented based on a helium purification, separation and recovery coupled system. The helium purification, separation and recovery coupled system includes: a compressor unit, a pretreatment unit, a membrane separation unit, and a pressure swing adsorption unit PSA. The compressor unit includes a first compressor unit K1 and a second compressor unit K2. The pretreatment unit includes a first pretreatment unit PR1 and a second pretreatment unit PR2. The membrane separation unit is a hollow fiber membrane component, a flat membrane component, a tubular membrane component, or a coiled membrane component, and includes a first membrane separation unit M1, a second membrane separation unit M2, and a third membrane separation unit M3. A specific embodiment is as follows.

A low-concentration helium-containing tail gas treated by using the separation and recovery process according to the present disclosure is used as a conventional tail gas exhausted from natural gas liquefaction, and the flow rate of the helium-containing tail gas is 500 $Nm^3/h$. The helium-containing tail gas has a pressure of 100 KPaG, a temperature of 40° C., a helium content of 4.95 vol %, a nitrogen content of 12.74 vol %, and a methane content of 82.31 vol %.

A helium-containing feed gas f1 and a recycle gas f10 are mixed and then are pressurized through the first compressor K1; the mixed gas of the helium-containing feed gas f1 and the recycle gas f10 enters the first pretreatment unit PR1 to remove liquid mist and dust through the first pretreatment unit PR1; a helium-containing gas f2 with a temperature adjusted to 40 to 100° C. enters the first membrane separation unit M1. The helium-containing gas f2 entering the first membrane separation unit M1 is divided into two material flows, namely, a preliminarily concentrated helium-rich permeated gas f3 and a retentate gas f4, through the first membrane separation unit M1. The preliminarily concentrated helium-rich permeated gas f3 is pressurized through the second compressor K2, subsequently enters the second pretreatment unit PR2 to remove liquid mist and dust through the second pretreatment unit PR2 and allow its temperature to be adjusted to 40 to 100° C., and then a flow f5 enters the second membrane separation unit M2. The retentate gas f4 passes through an inlet of the third membrane separation unit M3. The flow f5 is divided into two material flows, namely, a retentate gas f6 and a secondarily concentrated helium-rich permeated gas f7, through the second membrane separation unit M2. A first part of the secondarily concentrated helium-rich permeated gas f7 serves as a product with a medium helium concentration, and a second part of the secondarily concentrated helium-rich permeated gas f7 enters the pressure swing adsorption unit PSA for further concentration to produce a helium above grade A. The retentate gas f6 of the second membrane separation unit M2 and the retentate gas f4 of the first membrane separation unit M1 are mixed, and then enters the membrane separation unit M3. A mixed flow f9 is divided into two material flows, namely, a permeated gas f10 and a retentate gas f11, through the third membrane separation unit M3. The permeated gas f10 is returned to an inlet of the first compressor K1 for recycling. The retentate gas f11 and a desorption gas f8 from the pressure swing adsorption unit PSA are mixed and discharged from the coupled system to serve as gas-oil displacement and the like or are emptied.

Particles and the liquid mist which are pressurized by the compressor (K1), treated by the pretreatment unit (PR1), and then enter the membrane separation unit, all have diameters of less than 0.01 um, a temperature of 75° C., and a pressure of 2.3 MPaG.

The particles and the liquid mist which are pressurized by the compressor (K2), treated by the pretreatment unit (PR2), and then enter the membrane separation unit, all have diameters of less than 0.01 um, the temperature of 75° C., and the pressure of 2.4 MPaG.

The hollow fiber membrane components used by the first membrane separation unit M1, the second membrane separation unit M2, and the third membrane separation unit M3 are all glassy polyimide membranes.

The cycling flow inside the membrane separation unit: namely, the flow f10 has the helium content of 5.19 vol %.

In the present embodiment, a helium product gas 1 has the helium content of 94.72 vol %, a helium product gas 2 has the helium content of 99.99 vol %, and the recovery rate reaches 99%.

The above-mentioned embodiments only illustrate the implementations of the present disclosure, but cannot be construed as a limitation to the scope of the patent of the present disclosure. It should be noted that a number of variations and improvements may also be made by those skilled in the art without departing from the conception of the present disclosure, and all of these fall within the scope of protection of the present disclosure.

What is claimed is:

1. A separation and purification coupled process, which is implemented based on a helium purification, separation and recovery coupled system, wherein the coupled system comprises: a first compressor, a second compressor, a first pretreatment unit, a second pretreatment unit, a first membrane separation unit, a second membrane separation unit, a third membrane separation unit, and a pressure swing adsorption unit;

the process comprising:

mixing a helium-containing feed gas and a recycle gas to form a first mixture, passing the first mixture through the first compressor to be pressurized to produce a first pressurized gas, passing the first pressurized gas into the first pretreatment unit to remove liquid mist and dust and to adjust a temperature of the pressurized gas to 40 to 100° C. to produce a first pretreated gas, and passing the first pretreated gas into the first membrane separation unit;

passing the first pretreated gas through the first membrane separation unit to divide the first pretreated gas into two material flows, the two material flows being a preliminarily concentrated helium-rich permeated gas which is the gas that permeates through the first membrane separation unit preferentially and a first retentate gas, on a basis that different gases have different permeation rates upon passing through a same membrane; passing the preliminarily concentrated helium-rich permeated gas through the second compressor to be pressurized to produce a second pressurized gas, a passing the second pressurized gas into the second pretreatment unit to remove liquid mist and dust and to adjust a temperature of the second pressurized gas to 40 to 100° C. to produce a second pretreated gas, passing the second pretreated gas into the second membrane separation unit; and passing the first retentate gas into the third membrane separation unit through an inlet of the third membrane separation unit;

passing the second pretreated gas through the second membrane separation unit to divide the second pretreated gas into two material flows, the two material flows being a second retentate gas and a secondarily concentrated helium-rich permeated gas; discharging a first part of the secondarily concentrated helium-rich permeated gas from the coupled system as a product gas with medium helium concentration; passing a second part of the secondarily concentrated helium-rich permeated gas into the pressure swing adsorption unit to concentrate helium and to produce a helium above grade A; mixing the second retentate gas from the second membrane separation unit and the first retentate gas from the first membrane separation unit to produce a third pretreated gas; and passing the third pretreated gas through the third membrane separation unit to divide the third pretreated gas into two material flows, the two material flows being a permeated gas and a third retentate gas, returning the permeated gas to an inlet of the first compressor for recycling, mixing the third retentate gas and a desorption gas from the pressure swing adsorption unit to produce a product gas, and discharging the product gas from the coupled system.

2. The separation and purification coupled process according to claim 1, wherein each of the first membrane separation unit, the second membrane separation unit, and the third membrane separation unit is a hollow fiber membrane component, a flat membrane component, a tubular membrane component, or a coiled membrane component.

3. The separation and purification coupled process according to claim 2, wherein the hollow fiber membrane component, the flat membrane component, the tubular membrane component, or the coiled membrane component is an organic membrane, an inorganic membrane, or an organic-inorganic hybrid membrane.

4. The separation and purification coupled process according to claim 1, wherein each of the first pretreatment unit and the second pretreatment unit is a dispenser, a heat exchanger, a precise filter, and a demister.

5. The separation and purification coupled process according to claim 2, wherein each of the first pretreatment unit and the second pretreatment unit is a dispenser, a heat exchanger, a precise filter, and a demister.

6. The separation and purification coupled process according to claim 3, wherein each of the first pretreatment unit and the second pretreatment unit is a dispenser, a heat exchanger, a precise filter, and a demister.

* * * * *